(12) United States Patent
Kursun (10) Patent No.: US 11,050,772 B2
(45) Date of Patent: Jun. 29, 2021

(54) METHOD AND SYSTEM FOR IDENTIFICATION AND PREVENTION OF PROFILING ATTACKS IN ELECTRONIC AUTHORIZATION SYSTEMS

(71) Applicant: Bank of America Corporation, Charlotte, NC (US)

(72) Inventor: Eren Kursun, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 223 days.

(21) Appl. No.: 16/210,381

(22) Filed: Dec. 5, 2018

(65) Prior Publication Data
US 2020/0186554 A1 Jun. 11, 2020

(51) Int. Cl.
| H04L 29/06 | (2006.01) |
| G06N 20/00 | (2019.01) |
| G06N 5/04 | (2006.01) |

(52) U.S. Cl.
CPC ........... *H04L 63/1425* (2013.01); *G06N 5/04* (2013.01); *G06N 20/00* (2019.01); *H04L 63/1441* (2013.01); *H04L 63/20* (2013.01)

(58) Field of Classification Search
CPC . H04L 63/1425; H04L 63/1441; H04L 63/20; G06N 5/04
USPC .......................................................... 726/22
See application file for complete search history.

(56) References Cited

U.S. PATENT DOCUMENTS

| 5,210,789 A | 5/1993 | Jeffus et al. |
| 5,257,320 A | 10/1993 | Etherington et al. |
| 5,359,699 A | 10/1994 | Tong et al. |
| 5,371,673 A | 12/1994 | Fan |
| 5,414,755 A | 5/1995 | Bahler et al. |
| 5,526,401 A | 6/1996 | Roach et al. |
| 5,533,123 A | 7/1996 | Force et al. |
| 5,867,494 A | 2/1999 | Krishnaswamy et al. |
| 5,999,525 A | 12/1999 | Krishnaswamy et al. |
| 6,078,901 A | 6/2000 | Ching |
| 6,243,580 B1 | 6/2001 | Garner |
| 6,341,353 B1 | 1/2002 | Herman et al. |
| 6,411,806 B1 | 6/2002 | Garner et al. |
| 6,424,706 B1 | 7/2002 | Katz et al. |
| 7,225,343 B1 | 5/2007 | Honig et al. |

(Continued)

*Primary Examiner* — Tae K Kim
*Assistant Examiner* — Peilang Pan
(74) *Attorney, Agent, or Firm* — Michael A. Springs; Moore & Van Allen PLLC; Peter B. Stewart (57) ABSTRACT

An electronic authorization system is typically configured for: receiving electronic activity requests from a plurality of source nodes; analyzing each of the electronic activity requests using a decisioning algorithm, wherein a decision boundary of the decisioning algorithm is dynamically altered while analyzing the electronic activity requests; for each of the electronic activity requests, determining an activity exposure level of the decision boundary based on (i) a distance to the decision boundary and (ii) an amount of information exposed regarding the decision boundary; for each of the plurality of source nodes, determining a source exposure level of the decision boundary based on the activity exposure levels of the decision boundary of the electronic activity requests; and in response to determining that a likelihood of decision boundary profiling by one or more first source nodes exceeds a defined threshold, performing an exposure remediation action.

23 Claims, 4 Drawing Sheets

(56) References Cited

U.S. PATENT DOCUMENTS

| | | | |
|---|---|---|---|
| 7,323,970 B1 | 1/2008 | Murray et al. | |
| 7,403,922 B1 | 7/2008 | Lewis et al. | |
| 7,590,589 B2 | 9/2009 | Hoffberg | |
| 8,019,678 B2 | 9/2011 | Wright et al. | |
| 8,056,136 B1 * | 11/2011 | Zaitsev | G06F 21/56 |
| | | | 726/24 |
| 8,135,624 B1 | 3/2012 | Ramalingam et al. | |
| 8,418,249 B1 | 4/2013 | Nucci et al. | |
| 8,458,090 B1 | 6/2013 | Batra et al. | |
| 8,543,522 B2 | 9/2013 | Ryman-Tubb et al. | |
| 9,998,484 B1 * | 6/2018 | Buyukkayhan | G06F 16/285 |
| 2007/0180529 A1 * | 8/2007 | Costea | G06F 21/567 |
| | | | 726/24 |
| 2007/0226797 A1 * | 9/2007 | Thompson | H04L 63/1416 |
| | | | 726/22 |
| 2010/0063903 A1 | 3/2010 | Whipple et al. | |
| 2011/0185401 A1 * | 7/2011 | Bak | G06F 16/9024 |
| | | | 726/5 |
| 2012/0317644 A1 * | 12/2012 | Kumar | G06F 21/566 |
| | | | 726/24 |
| 2015/0199512 A1 * | 7/2015 | Kim | G06F 21/566 |
| | | | 726/23 |
| 2016/0180090 A1 * | 6/2016 | Dalcher | G06F 21/554 |
| | | | 726/23 |
| 2017/0017760 A1 | 1/2017 | Freese et al. | |
| 2017/0180416 A1 * | 6/2017 | Giura | H04L 63/1458 |
| 2018/0248904 A1 * | 8/2018 | Villella | G06N 3/088 |
| 2019/0324732 A1 * | 10/2019 | Le | G06F 8/52 |
| 2019/0347410 A1 * | 11/2019 | Kesarwani | G06F 21/577 |
| 2020/0005633 A1 * | 1/2020 | Jin | H04L 63/1441 |

* cited by examiner

METHOD AND SYSTEM FOR IDENTIFICATION AND PREVENTION OF PROFILING ATTACKS IN ELECTRONIC AUTHORIZATION SYSTEMS

FIELD OF THE INVENTION

The present invention embraces an electronic authorization system that is typically configured for: receiving electronic activity requests from a plurality of source nodes; analyzing each of the electronic activity requests using a decisioning algorithm, wherein a decision boundary of the decisioning algorithm is dynamically altered while analyzing the electronic activity requests; for each of the electronic activity requests, determining an activity exposure level of the decision boundary based on (i) a distance to the decision boundary and (ii) an amount of information exposed regarding the decision boundary; for each of the plurality of source nodes, determining a source exposure level of the decision boundary based on the activity exposure levels of the decision boundary of the electronic activity requests; and in response to determining that a likelihood of decision boundary profiling by one or more first source nodes exceeds a defined threshold, performing an exposure remediation action.

BACKGROUND

During the processing of electronic activity requests, activity processing systems are typically configured to authenticate each electronic activity request. A need exists for an improved way of preventing profiling of authentication algorithms employed by activity processing systems.

SUMMARY

In one aspect, the present invention embraces a computerized system, and an associated method and computer program product, for preventing, identifying and remediating decision boundary exposure. The system typically includes a processor and a memory. The system also typically includes a processing module stored in the memory and executable by the processor. In one embodiment, the processing module is configured for: receiving a plurality of electronic activity requests from a plurality of source nodes; analyzing each of the plurality of electronic activity requests using a decisioning algorithm, wherein a decision boundary of the decisioning algorithm is dynamically altered while analyzing the plurality of electronic activity requests; for each of the plurality of electronic activity requests, determining an activity exposure level of the decision boundary based on (i) a distance to the decision boundary and (ii) an amount of information exposed regarding the decision boundary; for each of the plurality of source nodes, determining a source exposure level of the decision boundary based on the activity exposure levels of the decision boundary of the plurality of electronic activity requests; based on determining the source exposure level of the decision boundary for each of the plurality of source nodes, determining that a likelihood of decision boundary profiling by one or more first source nodes of the plurality of source nodes exceeds a defined threshold; and in response to determining that the likelihood of decision boundary profiling by one or more first source nodes of the plurality of source nodes exceeds the defined threshold, performing an exposure remediation action, wherein the exposure remediation action includes: (i) blocking or denying subsequent electronic activity requests received from the one or more first source nodes, (ii) analyzing subsequent electronic activity requests received from the one or more first source nodes using a different decisioning algorithm, or (iii) dynamically altering the decision boundary of the decisioning algorithm while analyzing subsequent electronic activity requests received from the one or more first source nodes.

In a first particular embodiment, dynamically altering the decision boundary of the decisioning algorithm while analyzing the plurality of electronic activity requests includes randomly altering one or more parameters of the decisioning algorithm.

In a second particular embodiment, either alone or in combination with the other particular embodiments, the decisioning algorithm includes a plurality of sub-algorithms ensembled together.

In a third particular embodiment, either alone or in combination with the other particular embodiments, the exposure remediation action includes blocking or denying subsequent electronic activity requests received from the one or more first source nodes.

In a fourth particular embodiment, either alone or in combination with the other particular embodiments, the exposure remediation action includes analyzing subsequent electronic activity requests received from the one or more first source nodes using the different decisioning algorithm. The different decisioning algorithm may include a plurality of sub-algorithms ensembled together.

In a fifth particular embodiment, either alone or in combination with the other particular embodiments, the exposure remediation action includes dynamically altering the decision boundary of the decisioning algorithm while analyzing subsequent electronic activity requests received from the one or more first source nodes.

In a sixth particular embodiment, either alone or in combination with the other particular embodiments, the processing module is configured for determining, for each of the plurality of source nodes, an exposure level of unauthorized activity requests; and determining that the likelihood of decision boundary profiling by one or more first source nodes of the plurality of source nodes exceeds the defined threshold is further based on the exposure level of unauthorized activity requests from the one or more first source nodes.

In another aspect, the present invention embraces a processing system that is configured for: processing each of a plurality of electronic activities using a decisioning algorithm; determining an exposure level of a decision boundary of the decisioning algorithm; based on the exposure level of the decision boundary, performing an exposure remediation action, wherein the exposure remediation action comprises: (i) blocking or denying subsequent electronic activity requests received from one or more nodes, (ii) processing subsequent electronic activities using a different decisioning algorithm, or (iii) dynamically altering the decision boundary of the decisioning algorithm while processing subsequent electronic activities.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

An "entity" may be any person or organization implementing a system for resolving item-processing exceptions described herein. The entity may be any institution, group, association, financial institution, establishment, company, union, authority or the like. A "user" may be any person or entity using a system for resolving item-processing exceptions described herein. Often, a user is an employee of the entity. In some instances, a "user" is a customer of the entity.

As used herein, an "electronic activity" refers to any activity that a user wishes to perform with an electronic system (e.g., any computer system or other electronic system operated by an entity). In some instances, an electronic activity may refer to the processing of a resource transfer or transaction. A "resource transfer" or "transaction", may refer to any activities or communication between a customer (e.g., either an individual person or an organization) of an entity and the entity, activities or communication between multiple entities/customers, communication between technology applications and the like. A resource transfer may refer to a payment, processing of funds, processing of a check, purchase of goods or services, a return of goods or services, a payment transaction, a credit transaction, or other interactions involving a customer's resource or account. In the context of a financial institution or a resource entity such as a merchant, a resource transfer may refer to one or more of: a sale of goods and/or services, initiating an automated teller machine (ATM) or online banking session, an account balance inquiry, a rewards transfer, an account money transfer or withdrawal, opening a bank application on a customer's computer or mobile device, a customer accessing their e-wallet, or any other interaction involving the customer and/or the customer's device that invokes or is detectable by the financial institution. A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer" a "transaction", "transaction event" or "point of transaction event" refers to any activity initiated between a customer and a resource entity such as a merchant, between the customer and the financial instruction, or any combination thereof. In some embodiments, a resource transfer or transaction may refer to financial transactions involving direct or indirect movement of funds through traditional paper transaction processing systems (e.g., paper check processing) or through electronic transaction processing systems. In this regard, resource transfers or transactions may refer to the customer initiating a purchase for a product, service, or the like from a merchant. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, an electronic activity may refer to non-financial activities of the customer. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

An "electronic activity request" may be any request by a user to perform an electronic activity. Typically, a user initiates an electronic activity request from a source node, which may be any computing devices being used or accessed by the user. A source node may be a personal computer, a mobile device, a point-of-sale device, an automated teller machine, or similar device that a user employs to initiate a transaction.

In the instances where the entity is a financial institution, a customer may be an individual or organization with one or more relationships affiliations or accounts with the entity. An "account" may be the relationship that the customer has with the entity. Examples of accounts include a deposit account, such as a transactional account (e.g. a banking account), a savings account, an investment account, a money market account, a time deposit, a demand deposit, a pre-paid account, a credit account, a non-monetary customer profile that includes only personal information associated with the customer, or the like. An account may be associated with and/or maintained by an entity.

An "activity processing system" may be any system that processes electronic activity. For example, an activity processing system may be a resource transfer processing system (e.g., a check processing system, a credit card transaction processing system, and the like). In some instances, an activity processing system may be operated by the entity. In other instances, an activity processing system may be operated by a third party (e.g., a third party organization). In typical embodiments, the entity operates one or more of its own activity processing systems and is also in communication with activity processing systems operated by third parties.

In connection with processing electronic activities, activity processing systems are typically configured to employ a decisioning algorithm to decide to process such electronic activities. For example, activity processing systems are often configured to authenticate each electronic activity request, such as to determine that each such electronic activity request is authorized and that the user initiating each such electronic activity request is authorized to do so. An authentication algorithm is typically employed by an activity processing system when determining whether to authenticate an electronic activity request. An authentication algorithm typically considers various characteristics, such as activity type, transaction amount, location, transaction history, identity of the source, and the like, when determining whether to authenticate an electronic activity request. A decisioning algorithm may be a static, rules based algorithm and/or may employ machine learning.

Figure 4:
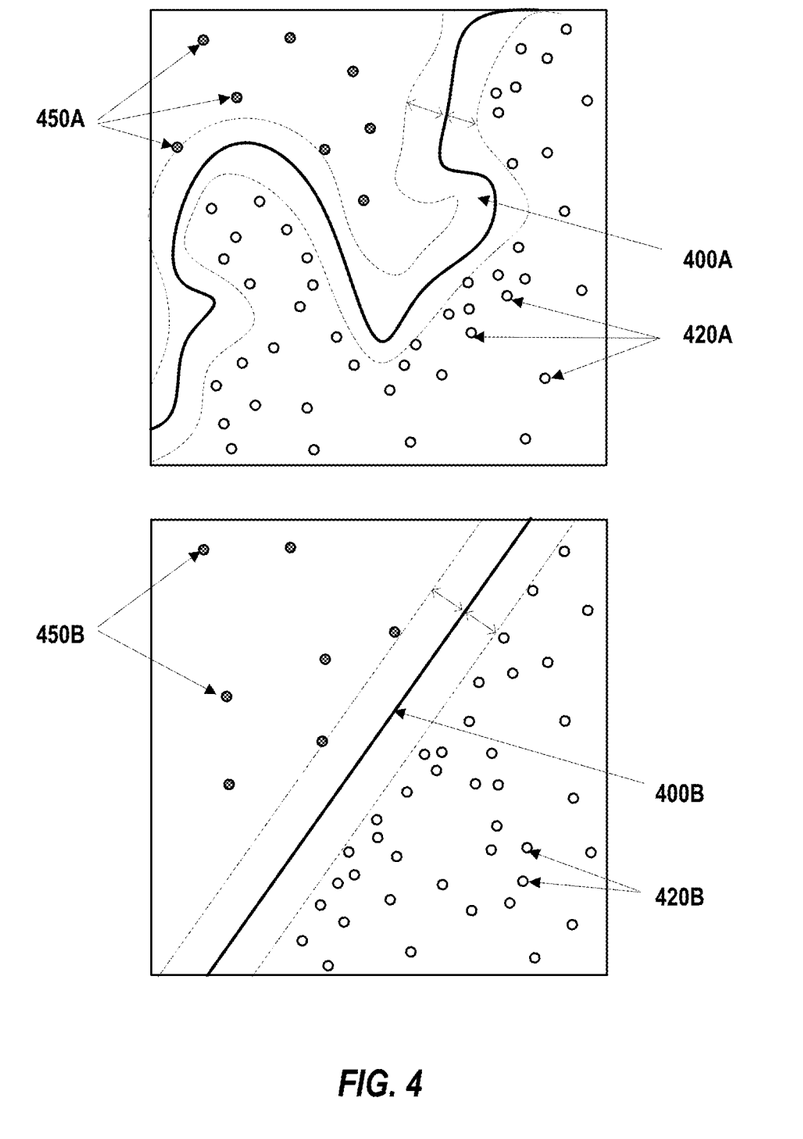
FIG. 4 depicts exemplary decision boundaries.

One challenge, in processing electronic activity requests is that an unauthorized user may attempt to identify the decision boundary of a decisioning algorithm. For example, an unauthorized user may attempt to identify the decision boundary of an authentication algorithm to facilitate the creation of unauthorized electronic activity requests that an activity processing system may fail to identify as inauthentic. A decision boundary of a decisioning algorithm represents the boundary between different types of processing decisions. For example, a decision boundary of an authentication algorithm represents the boundary between electronic activity requests that are authenticated and those that are denied by the authentication algorithm based on the characteristics of such electronic activity requests. FIG. 4 depicts exemplary decision boundaries 400A and 400B of two authentication algorithms. Under the authentication algorithms, the electronic activity requests 420A and 420B on the right side of the decision boundaries are determined to be authentic, whereas the electronic activity requests 450A and 450B on the left side of the decision boundaries are denied.

An unauthorized user may attempt to discover the decision boundary of a decisioning algorithm by submitting multiple electronic activity requests having various characteristics to an activity processing system. Based on the characteristics of the electronic activity requests that are allowed and denied by the activity processing system, such unauthorized user may be able to identify the decision boundary. If an unauthorized user is able to identify the decision boundary of a decisioning algorithm, such user may then be able to create unauthorized electronic activity requests that an activity processing systems may fail to identify as inauthentic. By way of example, an authentication algorithm may be configured to less strenuously analyze the authenticity of electronic activity requests having a transaction value below a defined threshold. Accordingly, if an unauthorized user, as part of identifying the decision boundary of such authentication algorithm, is able to identify such threshold, the unauthorized user may then be able to submit multiple electronic activity requests having a transaction value below such threshold knowing that such electronic activity requests are more likely to be approved.

Therefore, in one aspect, the present invention is directed to an improved electronic authorization system that is configured to prevent and remediate the discovery of the decision boundary of a decisioning algorithm, such as an authentication algorithm. In this regard, the electronic authorization system is typically configured to be aware of potential exposure of information about the decision boundary of a decisioning algorithm and take remediating actions based on any exposure. In some embodiments, the electronic authorization system is configured to dynamically alter the decision boundary of a decisioning algorithm (e.g., by randomly varying parameters associated with the decisioning algorithm), to thereby make the identification of the decision boundary more difficult. In some embodiments, the electronic authorization system is configured to determine whether the likelihood of decision boundary profiling by a source node exceeds a threshold. In other words, the electronic authorization system determines whether a source node is likely attempting to discover the decision boundary. This determination is typically made by identifying the exposure level of the decision boundary to a source node, such as by identifying how close electronic activity requests originating from such source node are to the decision boundary. If the exposure level of the decision boundary to a source node exceeds a threshold, such as due to such source node submitting a large number of electronic activity requests that are relatively close to the decision boundary, then such source node may be suspected as attempting to discover the decision boundary in an effort to engage in unauthorized electronic activities. Accordingly, if the exposure level of the decision boundary to a source node exceeds a threshold, the electronic authorization system may be configured to perform an exposure remediation action, such as blocking or denying subsequent electronic activity requests received from such source node, using a different decisioning algorithm when processing subsequent electronic activity requests received from such source node to thereby obfuscate the decision boundary of the initial decisioning algorithm, or dynamically altering the initial decisioning algorithm to thereby obfuscate the decision boundary of the initial decisioning algorithm.

Figure 1:
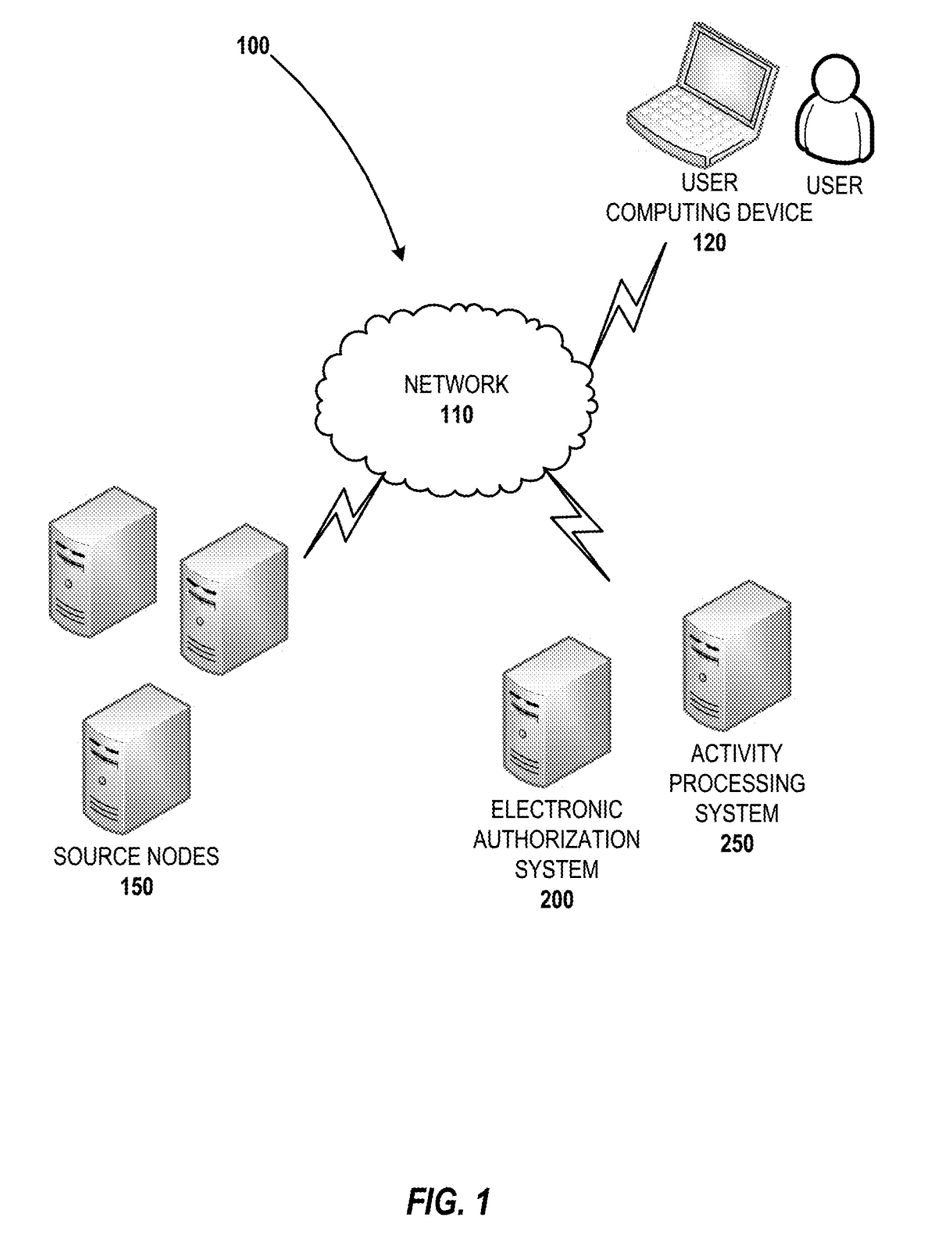
FIG. 1 depicts an operating environment in accordance with an aspect of the present invention.

FIG. 1 provides a block diagram illustrating an operating environment 100, in accordance with an embodiment of the present invention. As illustrated in FIG. 1, the operating environment 100 typically includes one or more activity processing systems 250. One or more of the activity processing systems 250 may be operated by the entity, and one or more of the activity processing systems 250 may be operated by one or more third parties.

The operating environment 100 also typically includes an electronic authorization system 200. The electronic authorization system 200 may be a sub-system within an activity processing system 250. Alternatively, the electronic authorization system 200 may be in communication with one or more of the activity processing systems 250 to facilitate authentication of electronic activity requests processed by such activity processing systems 250.

The electronic authorization system 200 and the one or more activity processing systems 250 are typically in communication with a network 110, such as the Internet, wide area network, local area network, Bluetooth network, near field network, or any other form of contact or contactless network. One or more users, each having a user computing device 120, such as a PC, laptop, mobile phone, tablet, television, mobile device, or the like, may be in communication with the item processing systems and the electronic authorization system 200 via the network 110. In addition, one or more source nodes 150 may be in communication with the electronic authorization system 200 and the one or more activity processing systems 250 via the network 110. The source nodes 150 may submit electronic activity requests to the electronic authorization system 200 and the one or more activity processing systems 250.

Figure 2:
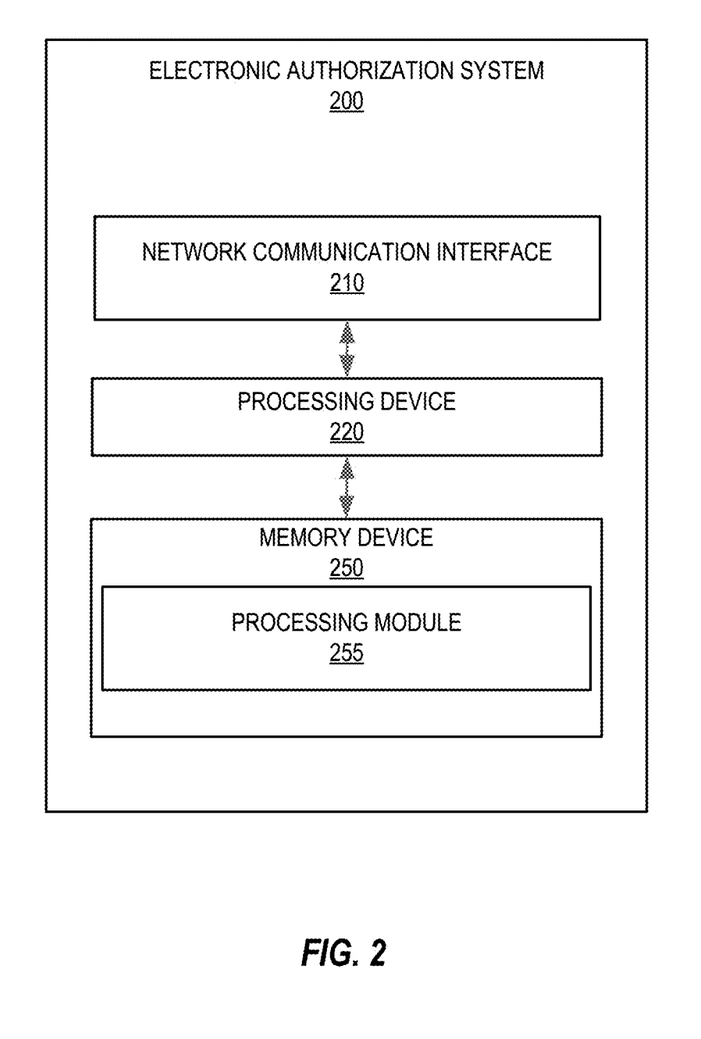
FIG. 2 schematically depicts an electronic authorization system in accordance with an aspect of the present invention.

FIG. 2 depicts the electronic authorization system 200 in more detail. As depicted in FIG. 2, the electronic authorization system 200 typically includes various features such as a network communication interface 210, a processing device 220, and a memory device 250. The network communication interface 210 includes a device that allows the electronic authorization system 200 to communicate with the activity processing systems 250, source nodes 150, and user computing devices 120 (e.g., over the network 110 (shown in FIG. 1)).

As used herein, a "processing device," such as the processing device 220, generally refers to a device or combination of devices having circuitry used for implementing the communication and/or logic functions of a particular system. For example, a processing device 220 may include a digital signal processor device, a microprocessor device, and various analog-to-digital converters, digital-to-analog converters, and other support circuits and/or combinations of the foregoing. Control and signal processing functions of the system are allocated between these processing devices (e.g., processors) according to their respective capabilities. The processing device 220 may further include functionality to operate one or more software programs based on computer-executable program code thereof, which may be stored in a memory. As the phrase is used herein, a processing device 220 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device," such as the memory device 250, generally refers to a device or combination of devices that store one or more forms of computer-readable media for storing data and/or computer-executable program code/instructions. Computer-readable media is defined in greater detail below. For example, in one embodiment, the memory device 250 includes any computer memory that provides an actual or virtual space to temporarily or permanently store data and/or commands provided to the processing device 220 when it carries out its functions described herein.

As noted, the electronic authorization system 200 is configured to analyze electronic activity requests using a decisioning algorithm. The electronic authorization system 200 is further configured to (i) obfuscate the decision boundary of the decisioning algorithm, (ii) identify source nodes that may be attempting to identify the decision boundary of the decisioning algorithm, and (iii) perform remediation actions in response to identifying any problematic source nodes. Accordingly, the electronic authorization system 200 typically includes one or more modules stored in the memory device 250, which facilitate such steps performed by the electronic authorization system 200. As depicted in FIG. 2, the electronic authorization system 200 typically includes a processing module 255 that is configured to prevent, identify, and remediate decision boundary exposure.

Figure 3:
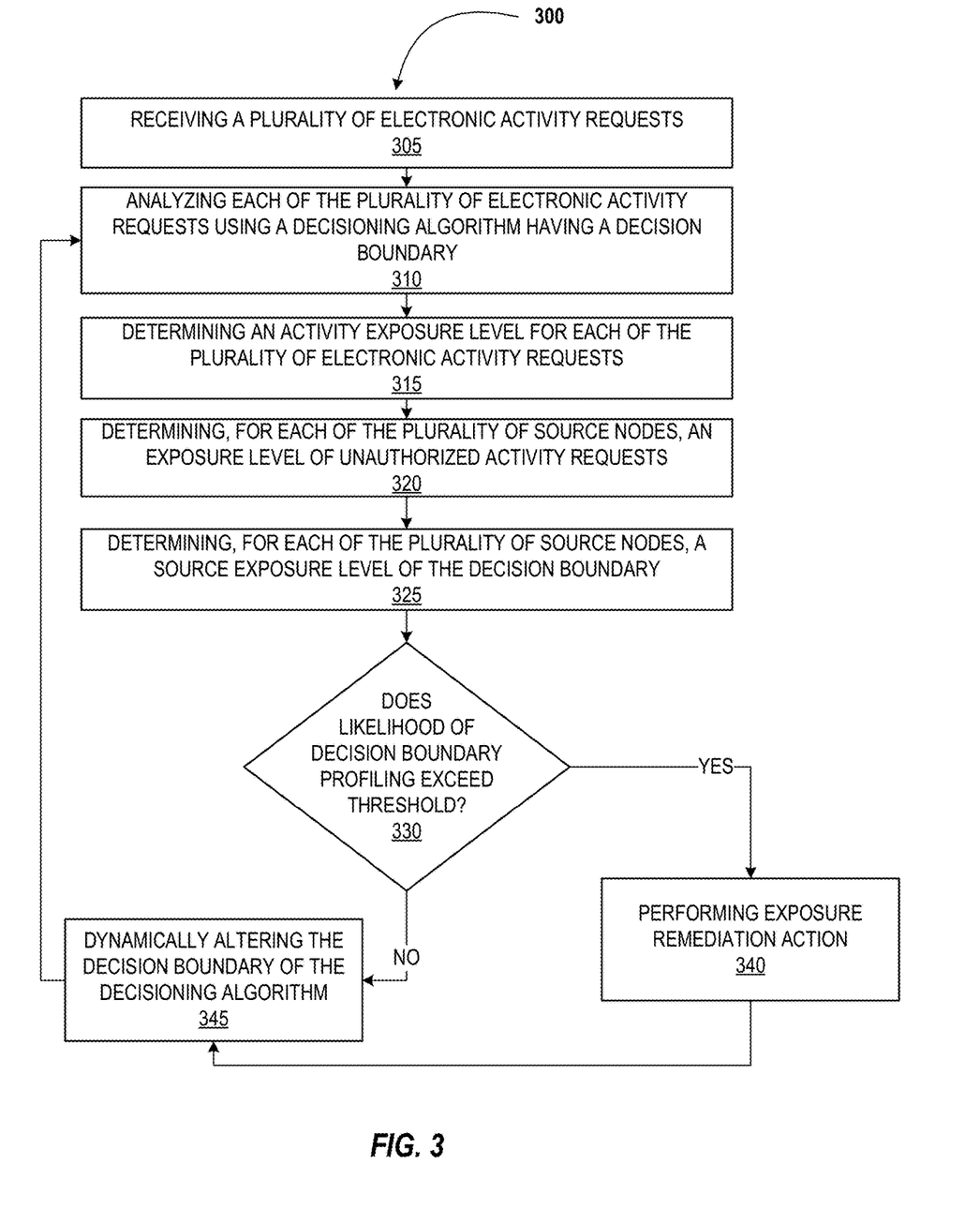
FIG. 3 depicts a method for preventing, identifying and remediating decision boundary exposure in accordance with an aspect of the present invention.

Referring now to FIG. 3, a method 300 is provided for preventing, identifying and remediating decision boundary exposure. This method 300 may be performed by the electronic authorization system 200.

At block 305, the method 300 includes receiving (e.g., by the electronic authorization system 200) a plurality of electronic activity requests. Each electronic activity request typically originates from a source node. The electronic authorization system 200 may receive each electronic activity request directly from the applicable source node. Alternatively, one or more intervening systems may receive and/or process each electronic activity request prior to being received by the electronic authorization system 200.

At block 310, the electronic authorization system 200 typically analyzes each of the plurality of electronic activity requests using a decisioning algorithm, such as an authentication algorithm. The authentication algorithm is typically employed to determine whether to authenticate each electronic activity request and typically considers various characteristics, such as activity type, transaction amount, location, transaction history, identity of the source, and the like. If an electronic activity request is determined to be authentic, then an associated activity processing system typically processes such electronic activity request; however, if an electronic activity request is not determined to be authentic, then an associated activity processing system typically denies such electronic activity request. In some embodiments, the decisioning algorithm may include a plurality of sub-algorithms ensembled together, thereby making it more difficult for source nodes to identify a decision boundary of the decisioning algorithm.

At block 315, the electronic authorization system 200 typically determines an activity exposure level for each of the plurality of electronic activity requests. As described above, a decisioning algorithm typically has a decision boundary. An activity exposure level for an electronic activity request reflects the amount of information about the decision boundary that is revealed by determining the authenticity of a particular electronic activity request. In this regard, the closer a particular electronic activity request is to the decision boundary, the more information about the decision boundary is likely to be revealed based on authenticating or not authenticating such electronic activity request. Typically, the activity exposure level is a numerical or other value that is determined based on the distance of a particular electronic activity request to the decision boundary. The activity exposure level may also be based on the amount of information revealed about the decision boundary. For example, an electronic activity request that exposes information about a single decisioning algorithm parameter may have a lower activity exposure level than another electronic activity request that exposes information about multiple decisioning algorithm parameters. The activity exposure level may also be based on the type of information revealed about the decision boundary. For example, an electronic activity request that exposes information about a heavily weighted parameter of the decisioning algorithm may have a higher activity exposure level than another electronic activity request that exposes information about a lightly weighted parameter of the decisioning algorithm.

At block 320, the electronic authorization system 200 typically determines, for each of the source nodes (or each group of related source nodes), an exposure level of unauthorized activity requests. For a source node (or group of related source nodes), the "exposure level of unauthorized activity requests" represents the likelihood of unauthorized electronic activity requests originating from such source node. Typically, the exposure level of unauthorized activity requests of a source node is a numerical or other value that is determined based on various factors, such as the volume of electronic activity requests originating from such source node, the number or percentage previous transactions authenticated or denied, historical data, customer reports of prior unauthorized electronic activity requests, and the like.

At block 325, the electronic authorization system 200 typically determines, for each of the source nodes (or each group of related source nodes), a source exposure level of the decision boundary. A source exposure level for a source node reflects the amount of information about the decision boundary that is revealed to a source node (or group of related source nodes) based on processing electronic activity requests originating from such source node (or group of related source nodes). Typically, the source exposure level is a numerical or other value that is determined based on the activity exposure levels of the electronic activity requests originating from a source node (or group of related source nodes).

At block 330, the electronic authorization system 200 typically determines, for each of the source nodes (or each group of related source nodes), whether such source node (or group of related source nodes) is potentially engaged in decision boundary profiling. In other words, the electronic authorization system 200 typically determines, for each of the source nodes (or each group of related source nodes), whether such source node is attempting to discover the decision boundary in an effort to engage in unauthorized electronic activities. For example, a source node may be suspected of engaging in decision boundary profiling if an unusually high number of electronic activity requests near the decision boundary originate from such source node. In typical embodiments, the electronic authorization system 200 determines whether the likelihood of decision boundary profiling exceeds a defined threshold. Whether a source node (or group of related source nodes) is potentially engaged in decision boundary profiling is typically based on (i) a source exposure level of the decision boundary for such source node (or group of related source nodes) and/or (ii) an exposure level of unauthorized activity requests for such source node (or group of related source nodes).

If a particular source node (or group of related source nodes) is determined to be potentially engaged in decision boundary profiling, then, at block 340, the electronic authorization system 200 typically performs an exposure remediation action. The exposure remediation action may include blocking or denying subsequent electronic activity requests that originate from such source node (or group of related source nodes). The exposure remediation action may include flagging such source node (or group of related source nodes) as being potentially engaged in decision boundary profiling. Additionally, one or more users (e.g., entity employees) may be alerted that a particular source node (or group of related source nodes) is engaging in decision boundary profiling. The exposure remediation action may include dynamically altering the decision boundary (e.g., altering the entire decision boundary or a segment of the decision boundary) of the decisioning algorithm when analyzing subsequent electronic activity requests received from such source node (or group of related source nodes). For example, parameters of the decisioning algorithm may be randomly altered. These alterations of the decision boundary may be designed to make it more difficult for such source node (or group of related source nodes) to discover additional information about the decision boundary. The decision boundary of the decisioning algorithm may also be altered by ensembling a plurality of sub-algorithms together. Where the decisioning algorithm already includes a plurality of sub-algorithms ensembled together, the weight factors associated with the sub-algorithms may be varied. The exposure remediation action may include using a different decisioning algorithm when analyzing subsequent electronic activity requests received from such source node (or group of related source nodes) to confuse such source node and prevent further discovery of the decision boundary of the initial decisioning algorithm. This different decisioning algorithm may include a plurality of sub-algorithms ensembled together. In addition, synthetic or mock data may be provided by the electronic authorization system 200 such source node (or group of related source nodes) so that such source node (or group of related source nodes) is not provided with the actual authentication decisions made by the electronic authorization system 200.

In typical embodiments, at block 345, the electronic authorization system 200 dynamically alters the decision boundary of the decisioning algorithm (e.g., altering the entire decision boundary or a segment of the decision boundary). This alteration is typically performed periodically while the electronic authorization system 200 analyzes electronic activity requests, rather than in response to determining that a particular source node may be engaged in decision boundary profiling. By periodically altering the decision boundary of the decisioning algorithm, the decision boundary is obscured from source nodes that may attempt to profile such decision boundary. In some embodiments, the decision boundary may be randomly altered, such as by randomly altering one or more parameters of the decisioning algorithm. The decision boundary of the decisioning algorithm may also be altered by ensembling a plurality of sub-algorithms together. Where the decisioning algorithm already includes a plurality of sub-algorithms ensembled together, the weight factors associated with the sub-algorithms may be varied.

As evident from the preceding description, the system described herein represents an improvement in technology by preventing, identifying and remediating decision boundary exposure. In particular, by dynamically altering the decision boundary of a decisioning algorithm, the system is able to reduce the likelihood of a source node being able to successfully profile the decision boundary. Moreover, the system is able to identify whether a source node is trying to profile the decision boundary, and, in response to determining that the source node is trying to profile the decision boundary, perform an exposure remediation action.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. An electronic authorization system, comprising:
one or more computer processors;
a memory; and
a processing module stored in the memory, executable by the one or more computer processors and configured for:
  receiving a plurality of electronic activity requests from a plurality of source nodes, wherein the plurality of source nodes comprise remote computing devices used or accessed by a user;
  analyzing each of the plurality of electronic activity requests using a decisioning algorithm, wherein a decision boundary of the decisioning algorithm is dynamically altered while analyzing the plurality of electronic activity requests;
  for each of the plurality of electronic activity requests, determining an activity exposure level of the decision boundary based on (i) a distance to the decision boundary and (ii) an amount of information exposed regarding the decision boundary;
  for each of the plurality of source nodes, determining an exposure level of unauthorized activity requests based on (i) a volume of electronic activity requests originating from the plurality of source nodes, (ii) a number or percentage of previous transactions authenticated or denied, (iii) historical data, and/or (iv) reports of prior unauthorized electronic activity requests;
  for each of the plurality of source nodes, determining a source exposure level of the decision boundary based on the activity exposure levels of the decision boundary of the plurality of electronic activity requests;

based on determining the source exposure level of the decision boundary for each of the plurality of source nodes and the exposure level of unauthorized activity requests from the one or more source nodes, determining that a likelihood of decision boundary profiling by one or more first source nodes of the plurality of source nodes exceeds a defined threshold; and in response to determining that the likelihood of decision boundary profiling by the one or more first source nodes of the plurality of source nodes exceeds the defined threshold, performing an exposure remediation action, wherein the exposure remediation action comprises: dynamically altering the decision boundary of the decisioning algorithm by randomly varying one or more parameters of the decisioning algorithm, and either: (a) blocking or denying subsequent electronic activity requests received from the one or more first source nodes, or (b) analyzing subsequent electronic activity requests received from the one or more first source nodes using a different decisioning algorithm.

2. The electronic authorization system according to claim 1, wherein dynamically altering the decision boundary of the decisioning algorithm while analyzing the plurality of electronic activity requests comprises randomly altering one or more parameters of the decisioning algorithm.

3. The electronic authorization system according to claim 1, wherein the decisioning algorithm comprises a plurality of sub-algorithms ensembled together.

4. The electronic authorization system according to claim 1, wherein the exposure remediation action comprises (i) dynamically altering the decision boundary of the decisioning algorithm by randomly varying one or more parameters of the decisioning algorithm, and (ii) blocking or denying subsequent electronic activity requests received from the one or more first source nodes.

5. The electronic authorization system according to claim 1, wherein the exposure remediation action comprises (i) dynamically altering the decision boundary of the decisioning algorithm by randomly varying one or more parameters of the decisioning algorithm, and (ii) analyzing subsequent electronic activity requests received from the one or more first source nodes using the different decisioning algorithm.

6. The electronic authorization system according to claim 5, wherein the different decisioning algorithm comprises a plurality of sub-algorithms ensembled together.

7. A computer program product for preventing, identifying and remediating decision boundary exposure, comprising a non-transitory computer-readable storage medium having computer-executable instructions for:

receiving a plurality of electronic activity requests from a plurality of source nodes, wherein the plurality of source nodes comprise remote computing devices used or accessed by a user;

analyzing each of the plurality of electronic activity requests using a decisioning algorithm, wherein a decision boundary of the decisioning algorithm is dynamically altered while analyzing the plurality of electronic activity requests;

for each of the plurality of electronic activity requests, determining an activity exposure level of the decision boundary based on (i) a distance to the decision boundary and (ii) an amount of information exposed regarding the decision boundary;

for each of the plurality of source nodes, determining an exposure level of unauthorized activity requests based on (i) a volume of electronic activity requests originating from the plurality of source nodes, (ii) a number or percentage of previous transactions authenticated or denied, (iii) historical data, and/or (iv) reports of prior unauthorized electronic activity requests;

for each of the plurality of source nodes, determining a source exposure level of the decision boundary based on the activity exposure levels of the decision boundary of the plurality of electronic activity requests;

based on determining the source exposure level of the decision boundary for each of the plurality of source nodes and the exposure level of unauthorized activity requests from the one or more source nodes, determining that a likelihood of decision boundary profiling by one or more first source nodes of the plurality of source nodes exceeds a defined threshold; and in response to determining that the likelihood of decision boundary profiling by the one or more first source nodes of the plurality of source nodes exceeds the defined threshold, performing an exposure remediation action, wherein the exposure remediation action comprises: dynamically altering the decision boundary of the decisioning algorithm by randomly varying one or more parameters of the decisioning algorithm, and either: (a) blocking or denying subsequent electronic activity requests received from the one or more first source nodes, or (b) analyzing subsequent electronic activity requests received from the one or more first source nodes using a different decisioning algorithm.

8. The computer program product according to claim 7, wherein dynamically altering the decision boundary of the decisioning algorithm while analyzing the plurality of electronic activity requests comprises randomly altering one or more parameters of the decisioning algorithm.

9. The computer program product according to claim 7, wherein the decisioning algorithm comprises a plurality of sub-algorithms ensembled together.

10. The computer program product according to claim 7, wherein the exposure remediation action comprises (i) dynamically altering the decision boundary of the decisioning algorithm by randomly varying one or more parameters of the decisioning algorithm, and (ii) blocking or denying subsequent electronic activity requests received from the one or more first source nodes.

11. The computer program product according to claim 7, wherein the exposure remediation action comprises (i) dynamically altering the decision boundary of the decisioning algorithm by randomly varying one or more parameters of the decisioning algorithm, and (ii) analyzing subsequent electronic activity requests received from the one or more first source nodes using the different decisioning algorithm.

12. The computer program product according to claim 11, wherein the different decisioning algorithm comprises a plurality of sub-algorithms ensembled together.

13. A computerized method for preventing, identifying and remediating decision boundary exposure, comprising:

receiving, via one or more computer processors, a plurality of electronic activity requests from a plurality of source nodes, wherein the plurality of source nodes comprise remote computing devices used or accessed by a user;

analyzing, via one or more computer processors, each of the plurality of electronic activity requests using a decisioning algorithm, wherein a decision boundary of the decisioning algorithm is dynamically altered while analyzing the plurality of electronic activity requests;

for each of the plurality of electronic activity requests, determining, via one or more computer processors, an activity exposure level of the decision boundary based on (i) a distance to the decision boundary and (ii) an amount of information exposed regarding the decision boundary;

for each of the plurality of source nodes, determining, via one or more computer processors an exposure level of unauthorized activity requests based on (i) a volume of electronic activity requests originating from the plurality of source nodes, (ii) a number or percentage of previous transactions authenticated or denied, (iii) historical data, and/or (iv) reports of prior unauthorized electronic activity requests;

for each of the plurality of source nodes, determining, via one or more computer processors, a source exposure level of the decision boundary based on the activity exposure levels of the decision boundary of the plurality of electronic activity requests;

based on determining the source exposure level of the decision boundary for each of the plurality of source nodes and the exposure level of unauthorized activity requests from the one or more source nodes, determining, via one or more computer processors, that a likelihood of decision boundary profiling by one or more first source nodes of the plurality of source nodes exceeds a defined threshold; and in response to determining that the likelihood of decision boundary profiling by the one or more first source nodes of the plurality of source nodes exceeds the defined threshold, performing, via one or more computer processors, an exposure remediation action, wherein the exposure remediation action comprises: dynamically altering the decision boundary of the decisioning algorithm by randomly varying one or more parameters of the decisioning algorithm, and either: (a) blocking or denying subsequent electronic activity requests received from the one or more first source nodes, or (b) analyzing subsequent electronic activity requests received from the one or more first source nodes using a different decisioning algorithm.

14. The computerized method according to claim 13, wherein dynamically altering the decision boundary of the decisioning algorithm while analyzing the plurality of electronic activity requests comprises randomly altering one or more parameters of the decisioning algorithm.

15. The computerized method according to claim 13, wherein the exposure remediation action comprises (i) dynamically altering the decision boundary of the decisioning algorithm by randomly varying one or more parameters of the decisioning algorithm, and (ii) analyzing subsequent electronic activity requests received from the one or more first source nodes using the different decisioning algorithm.

16. A processing system configured to be self-aware of decision boundary exposure, comprising:
   one or more computer processors;
   a memory; and
   a processing module stored in the memory, executable by the one or more computer processors and configured for:
   processing each of a plurality of electronic activities using a decisioning algorithm;
   determining an exposure level of a decision boundary of the decisioning algorithm;
   based on the exposure level of the decision boundary, determining that a likelihood of decision boundary profiling exceeds a defined threshold; and
   in response to determining that a likelihood of decision boundary profiling exceeds a defined threshold, performing an exposure remediation action, wherein the exposure remediation action comprises: dynamically altering the decision boundary of the decisioning algorithm by randomly varying one or more parameters of the decisioning algorithm, and either: (a) blocking or denying subsequent electronic activity requests received from one or more nodes, or (b) processing subsequent electronic activities using a different decisioning algorithm.

17. The processing system according to claim 16, wherein the decision boundary of the decisioning algorithm is dynamically altered while processing the plurality of electronic activities.

18. The processing system according to claim 16, wherein dynamically altering the decision boundary of the decisioning algorithm while processing the plurality of electronic activities comprises randomly altering one or more parameters of the decisioning algorithm.

19. The processing system according to claim 16, wherein determining the exposure level of the decision boundary of the decisioning algorithm comprises, for each of the plurality of electronic activities, determining an activity exposure level of the decision boundary based on (i) a distance to the decision boundary and (ii) an amount of information exposed regarding the decision boundary.

20. The processing system according to claim 19, wherein determining the exposure level of the decision boundary of the decisioning algorithm further comprises, for each of a plurality of nodes, determining a node exposure level of the decision boundary based on the activity exposure levels of the decision boundary of the plurality of electronic activities.

21. The processing system according to claim 20, wherein:
   the processing module is configured for determining, for each of the plurality of nodes, an exposure level of unauthorized activity requests based on (i) a volume of electronic activity requests originating from the plurality of source nodes, (ii) a number or percentage of previous transactions authenticated or denied, (iii) historical data, and/or (iv) reports of prior unauthorized electronic activity requests; and
   performing the exposure remediation action is further based on the exposure level of unauthorized activity requests from the plurality of nodes.

22. The processing system according to claim 16, wherein the exposure remediation action is performed in response to determining that a likelihood of decision boundary profiling exceeds a defined threshold.

23. The processing system according to claim 16, wherein the decisioning algorithm comprises a plurality of sub-algorithms ensembled together.

\* \* \* \* \*